Aug. 4, 1942.  W. G. MALO  2,292,234
CASE CARRYING TRUCK
Filed June 7, 1941
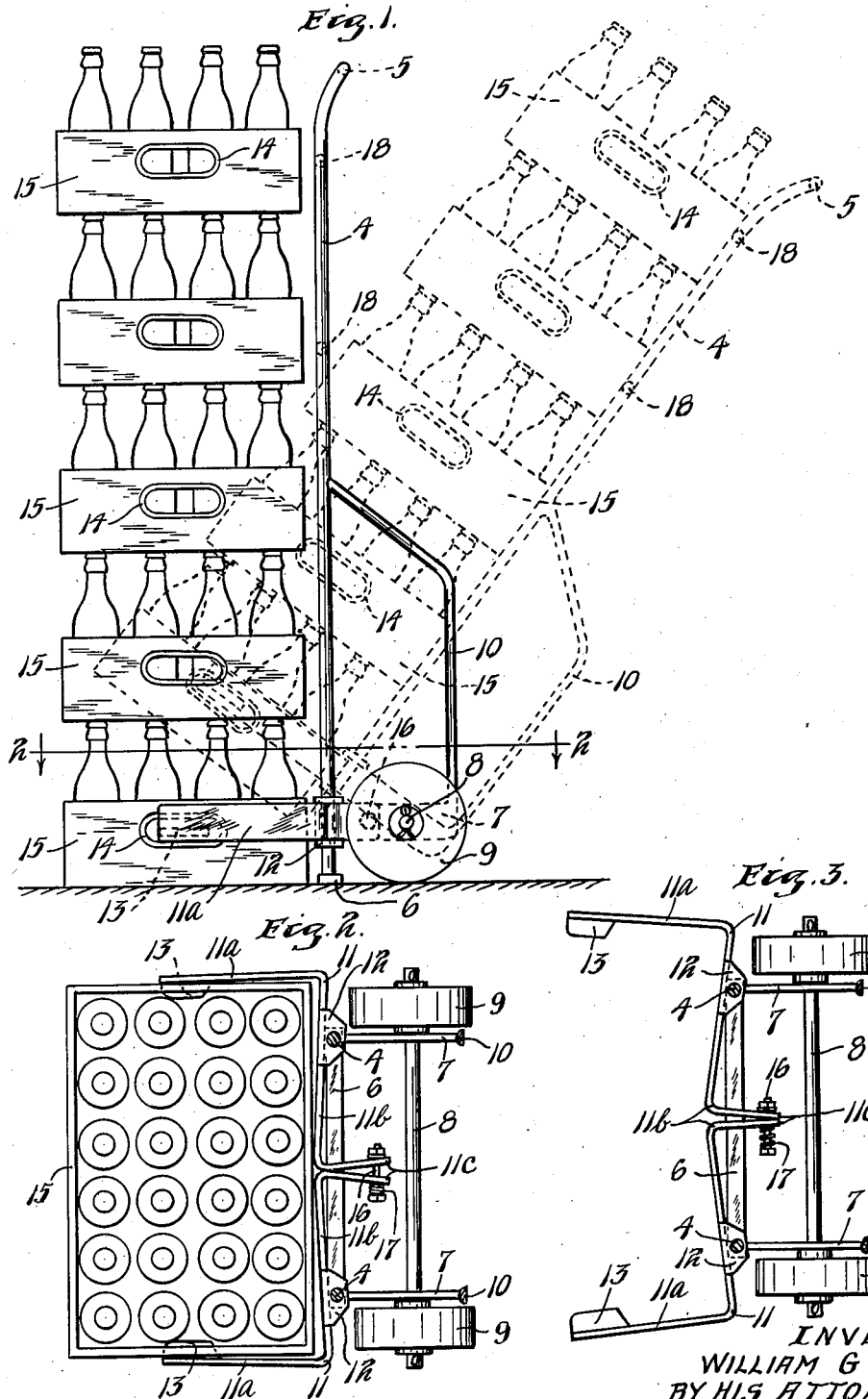
INVENTOR.
WILLIAM G MALO.
BY HIS ATTORNEYS.
Williamson & Williamson Patented Aug. 4, 1942

2,292,234

UNITED STATES PATENT OFFICE 2,292,234

CASE CARRYING TRUCK

William G. Malo, Marshall, Minn., assignor of one-half to Rolland Sherman, Marshall, Minn.

Application June 7, 1941, Serial No. 397,051

1 Claim. (Cl. 214—65.5)

This invention relates to industrial trucks and more particularly to hand trucks adapted for carrying cases of bottled goods.

It is an object of my invention to provide a truck which is capable of picking up and transporting a stack of cases of bottled goods and which is designed to pick up a case or stack of cases without requiring the tipping of the cases as is ordinarily necessary with conventional trucks which include a part which must be positioned beneath the lowermost case or other article.

Another object of the invention is to provide a truck which is adapted to grip a case of bottled goods at the usual apertures provided for hand holds so that the case is firmly held during its transportation on the truck.

A more specific object of the invention is to provide a truck having a pair of movable arms adapted to grip a case of bottled goods wherein the arms are swung into gripping contact with the case as the truck is pushed up against the case and to release the case when it has been deposited on the floor and the truck backed slightly away from it.

A further object of the invention is to provide a wheeled truck and a pair of skids positioned closely adjacent the wheels to facilitate movement up or down stairs.

Still another object of the invention is to provide a leg member adjacent the supporting wheels which permits the truck to be placed in an upright position when not in use so that it is readily available for use when desired.

A further object of the invention is to provide a truck having a pair of spaced longitudinal frame members and cross frame members, the latter being adapted to prevent the upper articles of a series of stacked articles from becoming dislodged and slipping between the side frame members.

These and other objects and advantages of the invention will more fully appear from the following description made in connection with the accompanying drawing, wherein like reference characters refer to the same parts throughout the views, and, in which:

Fig. 1 is a side elevation of an embodiment of my invention with a stack of cases of bottled goods, the full line position showing the stack as it is initially grasped and the dotted line position illustrating the position of the truck and stack of articles during transportation;

Fig. 2 is a section taken approximately on the line 2—2 of Fig. 1; and

Fig. 3 is a section taken at approximately the same point as that of Fig. 2, but with the case gripping means expanded.

In the drawing there is shown a truck having a pair of spaced parallel side members 4 connected at their tops by a cross member 5 which serves as a handle. The lower ends of the frame members 4 are connected by a foot piece 6. Extending rearwardly from each frame member 4 is a strap 7 which is welded to the frame member and an axle 8 extends between the two straps 7 and carries a pair of wheels 9. It should be noted that the wheels 9 and foot piece 6 are so related to each other that the truck will stand upright as shown in Fig. 1.

Extending upwardly from the rear ends of the straps 7 are skid members 10 which extend rearwardly nearly as far as the rearmost portions of wheels 9. With such an arrangement the truck can be conveniently rolled or can be slid up or down stairways.

Means is provided on the truck for gripping and supporting one or more containers such as cases of bottles usually provided for bottled beverages. The case gripping means includes a pair of arms 11 having spaced outwardly extending portions 11a and portions extending inwardly toward each other at 11b. The arm portions 11b have spaced ears 12 welded thereto, said ears being apertured to receive the truck frame members 4 so that the arms 11 are pivoted relative to said frame members. The spaced ears 12, as best shown in Fig. 1, fit on either side of the straps 7 at the point where said straps are connected to the frame members 4 and the straps 7 maintain the ears 12 and arms 11 in proper position longitudinally of said frame members 4.

The outer ends 11a of the arms 11 are provided with lateral extensions 13 which are positioned inwardly toward each other and are adapted to fit into apertures such as the hand hold apertures 14 in the beverage cases 15. The inwardly disposed adjacent ends of arm portions 11b are bent rearwardly as best shown in Figs. 2 and 3 at an angle slightly greater than ninety degrees. These bent ends 11c have a nutted bolt 16 extending through them relatively loosely and on the bolt is a helical spring 17 which normally urges the bent ends 11c on arms 11 toward each other to swing the outwardly extending ends 11a away from each other as illustrated in Fig. 3.

Preferably located adjacent the upper ends of the frame members 4 are two cross bars 18 which are shown to lie adjacent the two uppermost beverage cases 15 to prevent said cases, if accidentally shifted, from slipping between the side frame members 4.

When handling articles such as stacks of beverage containers with an ordinary hand truck having a portion which is adapted to be positioned beneath the lowermost article it is difficult to tip the stack in order to get the bottom of the truck beneath it. However, with my truck it is a simple matter to pick up and transport a stack of bottled beverage cases since it is unnecessary to get beneath the lowermost case in order to load the stack on the truck. The truck ordinarily has the arms 11 spread as shown in Fig. 3. It is rolled up to a stack of cases and the adjacent ends of the pivoted arm portions 11b are brought into contact with the side of the lowermost of the cases 15. A slight pressure of the truck against the lowest case causes the outwardly extending arm portions 11a to swing toward each other against the tension of the spring 17 and the lateral projections 13 on said arm portions 11a will swing into the hand-hold apertures 14 in the lowermost case 15. The truck is then tilted by placing one's foot against the axle 8 and pulling rearwardly on the handle 5. Due to the weight of the case or a stack of cases the spring 17 has insufficient strength to spread the arms 11 and the stack of cases is, therefore, securely held. When the cases have been moved to the point desired the truck is swung to a vertical position and the stack of cases deposited on the floor. As the weight of the cases is removed from the pivoted arms 11 the spring 17 will expand and the arms 11 will swing away from each other and out of engagement with the lowermost case 15.

In negotiating stairways the skids 10 permit the truck and its load to be smoothly slid along the edges of the stairs without the ordinary bumping which accompanies the movement of a wheeled device and movement of a loaded truck on a stairway is made considerably easier.

As stated above, the foot piece 6 permits the truck to be stood in an upright position when not in use so that it takes up little space and is in a convenient position for re-use when desired.

It will, of course, be understood that various changes may be made in the form, details, arrangement and proportions of the various parts without departing from the scope of my invention.

What is claimed is:

In an industrial truck, a frame, a wheel assembly supporting said frame, a pair of load engaging arms pivotally supported by said frame, said arms having portions extending outwardly from said frame in substantially parallel spaced relation, said arms having portions extending toward each other and having adjacent ends bent in directions opposite to said outwardly extending portions, a headed member extending through said bent adjacent end portions and being slidable relative to one of said end portions, and a compression spring interposed between the headed end of said member and said last mentioned end portion.

WILLIAM G. MALO.